(12) United States Patent
Hillman et al.

(10) Patent No.: US 6,679,724 B2
(45) Date of Patent: Jan. 20, 2004

(54) CONNECTOR

(75) Inventors: Ronald Hillman, Barrow-in-Furness (GB); Andrew W. Dickinson, Grange-over-Sands (GB); Philip Musker, Ulverston (GB); Joseph A. Nicholson, Broughton-in-Furness (GB)

(73) Assignee: Tronic Limited, Cumbria (GB)

( * ) Notice: Subject to any disclaimer, the term of this patent is extended or adjusted under 35 U.S.C. 154(b) by 204 days.

(21) Appl. No.: 09/827,590

(22) Filed: Apr. 6, 2001

(65) Prior Publication Data

US 2002/0022397 A1 Feb. 21, 2002

Related U.S. Application Data

(60) Provisional application No. 60/213,924, filed on Jun. 26, 2000.

(30) Foreign Application Priority Data

Apr. 6, 2000 (GB) .............................................. 0008497

(51) Int. Cl.⁷ ................................................. H01R 3/00
(52) U.S. Cl. ........................ 439/489; 439/315; 285/93
(58) Field of Search ................................ 439/489, 488, 439/314, 313, 315, 319, 470, 519, 586; 285/187, 93, 305, 319, 308, 86

(56) References Cited

U.S. PATENT DOCUMENTS 5,033,513 A * 7/1991 Bartholomew .............. 138/109

FOREIGN PATENT DOCUMENTS

| GB | 2 033 174 A | 9/1979 |
| GB | 2 059 185 A | 7/1980 |

* cited by examiner

Primary Examiner—P. Austin Bradley
Assistant Examiner—PhuongChi Nguyen
(74) Attorney, Agent, or Firm—Alix, Yale & Ristas, LLP

(57) ABSTRACT

A connector for under water or severe environment use, comprising first and second connector parts adapted to be brought together into a mated condition, and an indicator for indicating when the first connector part and the second connector parts are fully mated, the indicator being provided on the first connector part and having at least one radially outwardly extending protrusion, the radial protrusion being movable during mating of the first and second connector parts, from a radially outer position when the connector is in the unmated condition, to a radially inner position indicating that the connector is in the fully mated condition.

19 Claims, 5 Drawing Sheets

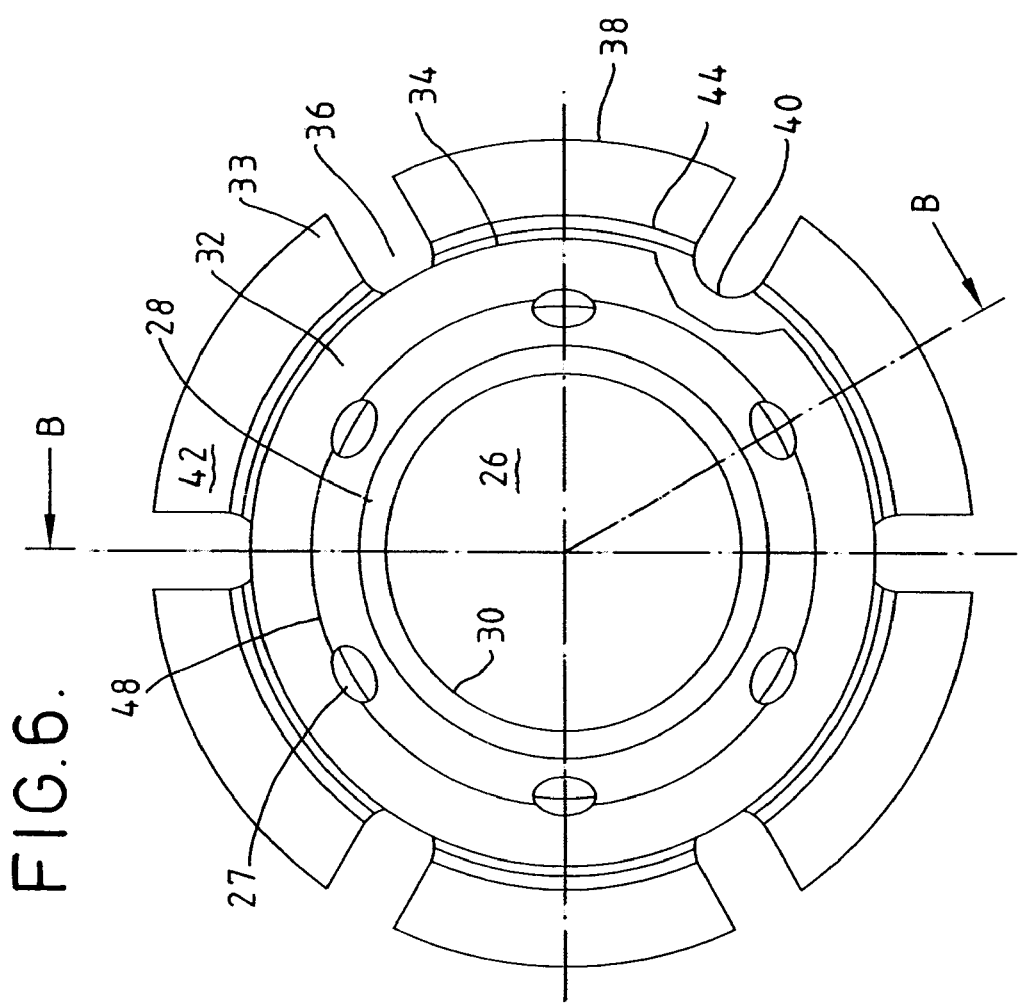

CONNECTOR

REFERENCE TO RELATED APPLICATION

This application claims the benefit of U.S. Provisional Application No. 60/213,924, filed Jun. 26, 2000.

FIELD OF THE INVENTION

The present invention relates to a connector for under water or severe environment use, for example for the transmission of electrical, optical, hydraulic, air or other services, and to an indicator and/or a seal for use in such a connector.

BACKGROUND OF THE INVENTION

It is known in the offshore oil and gas industry to connect up services at under water sites such as a well head installed on the sea bed. It is known from GB-A-2 192 316 to provide an under water electrical connector having a first part provided with a plug which houses a set of electrical contact terminals and a second part provided with a mating socket surrounding a corresponding set of electrical contact pins. The plug has a cylindrical outer surface designed to fit in the socket which is also cylindrical. In use, the second part of the connector is normally secured to a sea bed installation and the first part is mated with the second part by a diver who inserts the plug into the socket, whereby the contact pins make electrical contact with the contact terminals.

In some circumstances, for example in deep water, it may be preferred to use a remotely operated vehicle (ROV) rather than a diver to make the connection. The plug may be formed with a rounded front end and the socket may be provided with a guide cone at its front end to assist mating of the connector parts, as disclosed in WO92/12554. So that the ROV operator knows when the parts are fully mated, cameras are provided to provide images of the operation. However, it is sometimes difficult to see whether or not the connector parts are in fact fully mated and this can result in considerable expense as the lack of an electrical connection due to the connector not being fully mated may not be discovered until after the ROV has moved away from the installation site. In this instance, the ROV must be relocated to the installation site to connect the parts resulting in a waste of time and money. Equally, if the connection is being made by a diver, the lack of full mating may not be discovered until the diver has left the site, leading to the same problem.

One solution to the above problem which is known in the art is to provide a peg on the socket connector part. The peg is adapted to tilt away from the line of the connector by between about 15–30° when the connector parts are fully mated so as to provide a visual indication to the ROV pilot that the connector parts are fully mated. However, the provision of such a peg adds complexity to the design of the socket connector part thus increasing manufacturing costs and reducing reliability.

Consequently, the present invention seeks to provide a visual indication to an ROV pilot or a diver of when the parts of a connector are fully mated without increasing the complexity of the design of the connector parts.

SUMMARY OF THE INVENTION

Viewed from a first aspect, the invention provides a connector for under water or severe environment use, comprising first and second connector parts adapted to be brought together from an unmated condition into a mated condition, and an indicator for indicating when the first connector part and the second connector part are fully mated, the indicator being provided on the first connector part and having at least one radially outwardly extending protrusion, the radial protrusion being movable during mating of the first and second connector parts, from a radially outer position or a radially inner position when the connector is in the unmated condition, to a radially inner position or a radially outer position, respectively, indicating that the connector is in the fully mated condition.

When the radial protrusion is in the radially outer position it will normally be visible to an ROV pilot via a camera or directly visible to a diver. The radial protrusion may include markings or colouration enabling the ROV pilot or the diver to see when it has moved from one radial position to the other and thus that the connector is fully mated. For example, a brightly coloured, e.g. orange, ring or other marking may align with a fixed portion of one of the connector parts at the point when the connector is fully mated. Alternatively the radial protrusion may be arranged when in the radially outer position to extend radially beyond an adjacent portion, e.g. a wall portion of the first connector part, and when in the radially inner position to be retracted below that adjacent portion. The radial protrusion in the inner position may then not be visible when viewed generally axially from the other side of the adjacent portion, for example by a camera or a diver.

The radial protrusion may be in the radially inner position when the connector is unmated, and in the radially outer position when the connector is mated. A marking or word, such as "mated", may become visible when the connector is mated. The radial protrusion may for example be urged by the second connector part during mating from the inner position to the outer position. The radial protrusion may then return under its own resilience to the inner position when the connector parts are unmated. Alternatively, it may be held by a catch or the like in the inner position when the connector parts are unmated, the catch being actuated by the second connector part during mating to allow the radial protrusion to move to the outer position. The catch may then be arranged to recapture the radial protrusion and return it to the inner position when the connector parts are unmated.

Preferably, the radial protrusion is movable during mating from the radially outer position to the radially inner position, which latter position indicates that the connector is fully mated.

Preferably, the first and second connector parts have respective wall portions which, in the mated condition of the connector, together define an enclosure, wherein the radial protrusion is contained in the enclosure when in its radially inner position. Thus the radial protrusion is no longer visible to an ROV operator or a diver (a user) once it has withdrawn into the enclosure, thereby indicating that the connector is fully mated. Particularly if the radial protrusion is brightly coloured, its disappearance from view can give a user confidence that full mating has been achieved.

There may be a single radial protrusion, protruding outwardly from the first connector part at a suitable location for it to be readily visible. Thus the radial protrusion may be provided over only a limited extent of the circumference of the first connector part. Alternatively it may extend all the way round the periphery of the connector part, for example being annular in shape. This has the advantage that the radial protrusion is visible from several directions. In preferred arrangements, a plurality of radial protrusions is provided, all such radial protrusions being movable to indicate that the connector is in the fully mated condition. A plurality of radial protrusions has the advantage of being more readily visible than a single protrusion. The radial protrusions may be provided about the periphery of the first connector part separated from each other by radial slots. They may thus be in the form of petals. The radial slots may be simple cuts in the material of the indicator, but preferably they are wider, e.g. cut out, regions, such that interference between adjacent flaps is avoided when in the radially inner position.

The or each radial protrusion may be arranged to move to the radially inner position in various ways. In the embodiments in which the radial protrusion adopts the inner position when the connector parts are mated, the movement will be in response to the bringing together of the first and second connector parts. The inward movement of the radial protrusion may therefore be achieved by appropriate interaction of the indicator with the second connector part. In a preferred embodiment, during mating the indicator is engaged by a wall portion of the second connector part so that the radial protrusion is bent or squashed from the radially outer position to the radially inner position indicating that the connector is fully mated Preferably the wall portion of the second connector part is provided with a surface slanted relative to the axial direction, e.g. an inwardly facing conical surface, against which the indicator engages during mating.

The indicator is preferably provided with a nose portion which projects forwardly for engagement by the second connector part, e.g. the wall portion, during mating with such an arrangement, rearward urging of the nose portion by the second connector part can cause rearward and inward pivoting of the radial protrusion of the indicator. Advantageously, a rearward movement of the nose portion can be amplified to a larger movement of the outermost extremity of the radial protrusion. This can for example be achieved by providing the nose portion at the base of the radial protrusion, with the radial dimension of the radial protrusion being greater than the forward projection of the nose portion. In the embodiments where the radial protrusion(s) is (are) provided about the periphery of the first connector part, the nose portion may be in the form of a peripherally extending rim, e.g. a circular rim, the front edge of which is arranged for engagement by the second connector part during mating.

The or each radial protrusion is preferably arranged to tilt rearwardly during mating generally about a base region thereof. The radial protrusion may be provided with a defined hinge portion, e.g. a portion thinner than the rest of the radial protrusion, located outwardly of the base region. The tip of the radial protrusion, i.e. that part outward of the hinge portion, may tilt forwardly during mating about the hinge portion. This may be achieved by the engagement of the tip of the radial protrusion with a wall portion of the first connector part as the radial protrusion tilts rearwardly about its base region. In a preferred embodiment, therefore, the radial protrusion is arranged to pivot in two places, rearwardly about its base region and forwardly about the hinge portion located outwardly of the base. The provision of the defined hinge portion helps to ensure that the tip is retracted inwardly as the radial protrusion tilts rearwardly. Where a plurality of radial protrusions, e.g. petals, are provided about the periphery of the first connector part, the hinge portion may be formed by a circumferential groove interrupted by the radial slots between the radial protrusions.

The indicator preferably has a hub from the front of which the or each radial protrusion extends radially outwardly. Thus, outwardly of the hub there is a space into which the radial protrusion can tilt rearwardly. In the preferred embodiment having a nose portion, during mating the nose portion may be engaged and urged rearwardly by the second connector part, causing the radial protrusion to tilt rearwardly about its base region, where it is supported at the front of the hub, into the space around the hub. The front of the hub is preferably radially outwardly spaced from the first connector part to allow additional space for inward movement of the front of the hub during the final part of mating. For example, the indicator may have a collar for engagement with the first connector part, and the front of the hub may be spaced from the collar by a radial gap.

The radial protrusion and other parts of the indicator could be made from a variety of materials. The radial protrusion may for example be made of a relatively rigid material in a case where a suitable hinge (or hinges) is (are) provided to allow movement. However, in an advantageous embodiment, the radial protrusion is made of a deformable material, more preferably a resilient material such as an elastomer, e.g. nitrile rubber or hydrogenated nitrile rubber. This will allow the radial protrusion to be deformed as necessary to show when the connector is in the fully mated condition and to resume its original shape so as to be visible again when the connector is demated.

The indicator may advantageously serve to function as a seal with the second connector part, as well as to indicate that the parts are fully mated. Preferably, therefore, the indicator further comprises a seal extending about the periphery of the first connector part for sealing with the second connector part when the connector is mated. Such a seal can assist in preventing the entry of debris into the mated connector parts.

In the preferred embodiment where the nose portion projecting forwardly of the radial protrusion forms a peripherally extending rim, this rim may seal with the second connector part.

If a hub is provided to the rear of the radial protrusion, this hub may seal with the first connector part. Alternatively or additionally, the indicator may have a collar extending round the first connector part to form a seal therewith. The indicator may thus seal between the first and second parts when the connector is mated If the indicator forms a seal between the first and second connector parts, such that a region inwardly of the seal is protected from contaminants, it may be necessary to make provision for this region to be vented to the outside during mating of the connector parts. In a situation where the volume of the region decreases during mating, if it is not adequately vented ambient water may be forced to take a flow path during mating which may disrupt the indicating function, for example by preventing the or each radial protrusion from moving to the position indicative that the connector is fully mated. Venting may be achieved by providing an appropriate vent path at the interface of the first and second connector parts. Alternatively or additionally, the indicator may comprise vent means to allow flow of water from one side of the indicator to the other. The provision of vent means can enable the water to flow in a controlled manner.

The vent means may be provided on the indicator at a location such that it allows water flow during mating of the connectors but is closed when the connector is fully mated. The closing may be achieved by deformation of the indicator. Even if there is not full closure there will preferably be sufficient closure of the vent means to prevent most debris, e.g. sand, from entering into the mated connector parts. In preferred embodiments, the vent means is provided at the base of the radial protrusion(s). The vent means preferably comprises a plurality of vent openings, which may be circumferentially spaced from each other.

It is believed that an indicator which also functions as a seal is inventive in its own right. Viewed from a further aspect, therefore, the invention provides a connector for under water or severe environment use, comprising first and second connector parts adapted to be brought together into a mated condition, and an indicator for indicating when the first connector part and the second connector parts are fully mated, the indicator being provided on the first connector part and having a movable portion arranged to move during mating of the connector parts between a position indicating that the connector is unmated and a position indicating that the connector is fully mated, the indicator comprising a seal extending about the periphery of the first connector part for sealing with the second connector part when the connector is mated.

Such an indicator provides the advantage of fulfilling two functions thus reducing manufacturing costs and complexity. The combined indicator and seal is preferably a single moulding of a suitable elastomeric material. It may incorporate the various features discussed above in relation to the indicator.

The indicator may be intended to be permanently fixed to the first connector part but is preferably removably provided thereon, so as to be replaceable if desired. The invention also extends to an indicator for use as part of a connector as described herein. Such an indicator may be provided for example as a replacement part for the connector.

As discussed above, it is known from WO92/12554 to provide a connector having connector parts for connection under water, one connector part being in the form of a plug with a rounded front end and the other connector part having an axial socket, the plug being guided into the socket during mating by the inner surface of a guide cone at the front of the socket. An annular lip seal is provided towards the rear of the plug, the lip seal having an L-shape as viewed in axial section and being arranged with the upright of the "L" at the front and the base of the "L" extending to the rear. The base of the "L" extends annularly about the plug and the upright provides a sealing flange. Such a lip seal is shown as reference 98 in FIG. 16 of WO92/12554. When the plug is mated into the axial socket the sealing flange engages against the guide cone and forms a seal preventing the entry of debris such as sand into the area inwardly of the seal.

A disadvantage associated with the known lip seal described is that substantially the whole surface area of the sealing flange will be in contact with the inner surface of the guide cone when the parts are mated. Although this provides a very effective seal between the connector parts, the seal is held so tightly against the inner surface of the guide cone that there is potential for the seal to be removed from the plug when the connector is demated. This means that the seal must be replaced before the connector parts may be remated which is difficult and time consuming to achieve in a subsea environment and inconvenient if the plug has to be taken to surface for this reason alone.

Consequently, in a further aspect, the invention seeks to provide a seal for use with a connector which overcomes the problems described above.

Thus, viewed from a further aspect, the present invention provides a connector for under water or severe environment use, comprising a connector part having a plug and another connector part having an axial socket, the two connector parts being adapted to be brought together into a mated condition in which the plug is mated in the axial socket, the connector further comprising a guide portion at the front of the axial socket for guiding the plug into the axial socket during mating, and a seal extending about the periphery of the plug for sealing against the guide portion when the connector parts are mated, the seal having a peripherally extending rim having a front edge for sealing against the guide portion.

The seal may have a relatively small surface area (i.e. the front edge of the rim) in contact with the guide portion, e.g. a guide cone, when the connector is mated, and consequently the possibility of the seal sticking to the guide portion when the connector is demated is greatly reduced.

The seal may have a collar which seals with the plug of the connector. In some preferred embodiments, the seal further comprises a hub having a peripherally extending rear edge for sealing with the plug, for example a peripherally extending wall portion of the plug. Such a wall portion may be in the form of an annular flange.

BRIEF DESCRIPTION OF THE DRAWINGS

Certain preferred embodiment of the invention will now be described, by way of example only, and with reference to the accompanying drawings in which;

FIG. 6 is a front elevation view of an indicator of a second embodiment;

FIG. 7 is a section along B—B of FIG. 6; and

DESCRIPTION OF THE PREFERRED EMBODIMENTS

Figure 1:
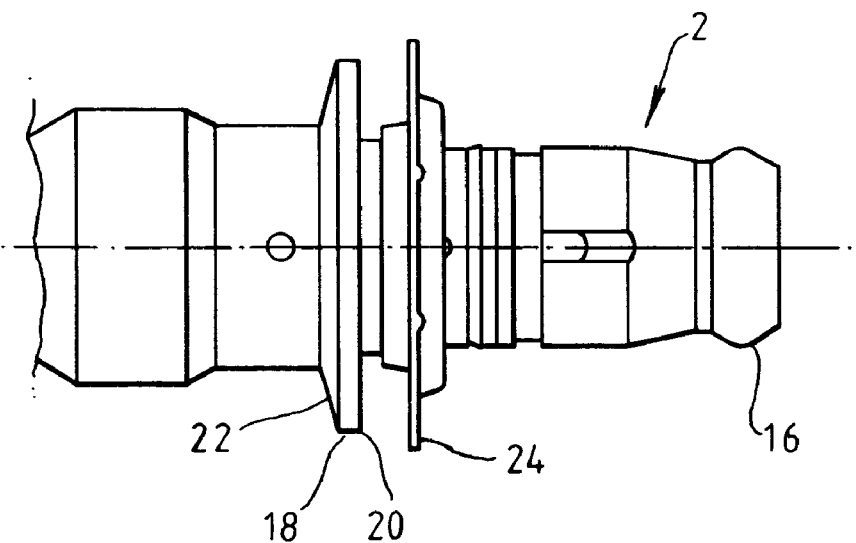
FIG. 1 is a plan view of the front portion of a plug connector part.
Figure 2:
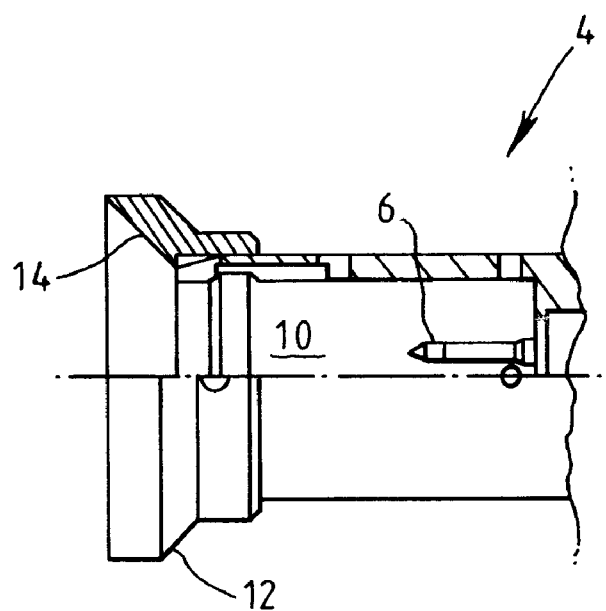
FIG. 2 is a partly sectioned side view of the front portion of a socket connector part.

A connector for underwater or severe environment use is made up of first plug connector part 2 as shown in FIG. 1 and a second socket connector part 4 as shown in FIG. 2. The plug connector part 2 and socket connector part 4 are adapted to be brought together in use into the mated condition so as to form an electrical connection. As shown in FIG. 2, the socket connector part 4 has at least one male connecting pin 6 and the plug connector part 2 has a corresponding number of female contact sockets 8 (not shown). To make a connection, each connecting pin 6 pushes back a respective shuttle piston (not shown) to make contact with the corresponding contact socket.

The socket connector part 4 has at its rear a flange (not shown) for connection to a seabed installation such as a wellhead, an axial chamber 10 for receiving the plug connector part 2 and, at its front end, a conical wall portion 12 extending outwardly from the axial chamber 10 for guiding the plug connector part 2 into the socket connector part 4. The conical portion 12 provides an inwardly facing conical surface 14.

As shown in FIG. 1, the plug connector part 2 has a rounded front end 16 to assist mating of the connector parts. A handle (not shown) is provided on the plug connector part 2 to assist a diver or an ROV pilot in bringing the connector parts into mating contact. The handle could for example be attached to the plug connector part by means of a yoke mounted in a rubber bushing and extending around the outer circumference of the plug connector part as is known in the art.

An annular wall portion 18 is provided on the plug connector part 2. This is in the form of a radially extending front facing flange 20 and a rearwardly facing conical part 22. An indicator seal 24 is provided on the plug connector part 2, forwardly of the wall portion 18.

Figure 4:
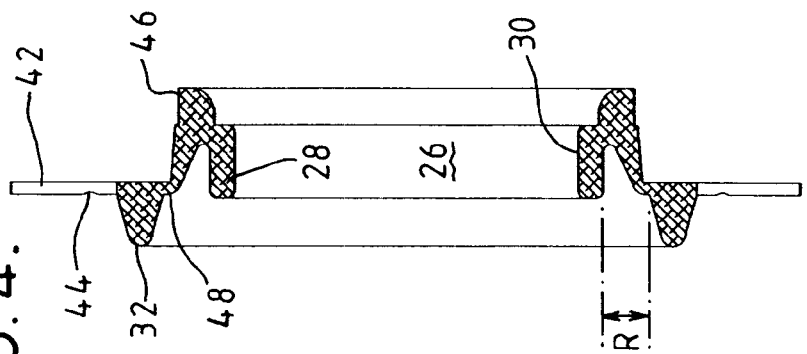
FIG. 4 is a section along line A—A of FIG. 3.
Figure 3:
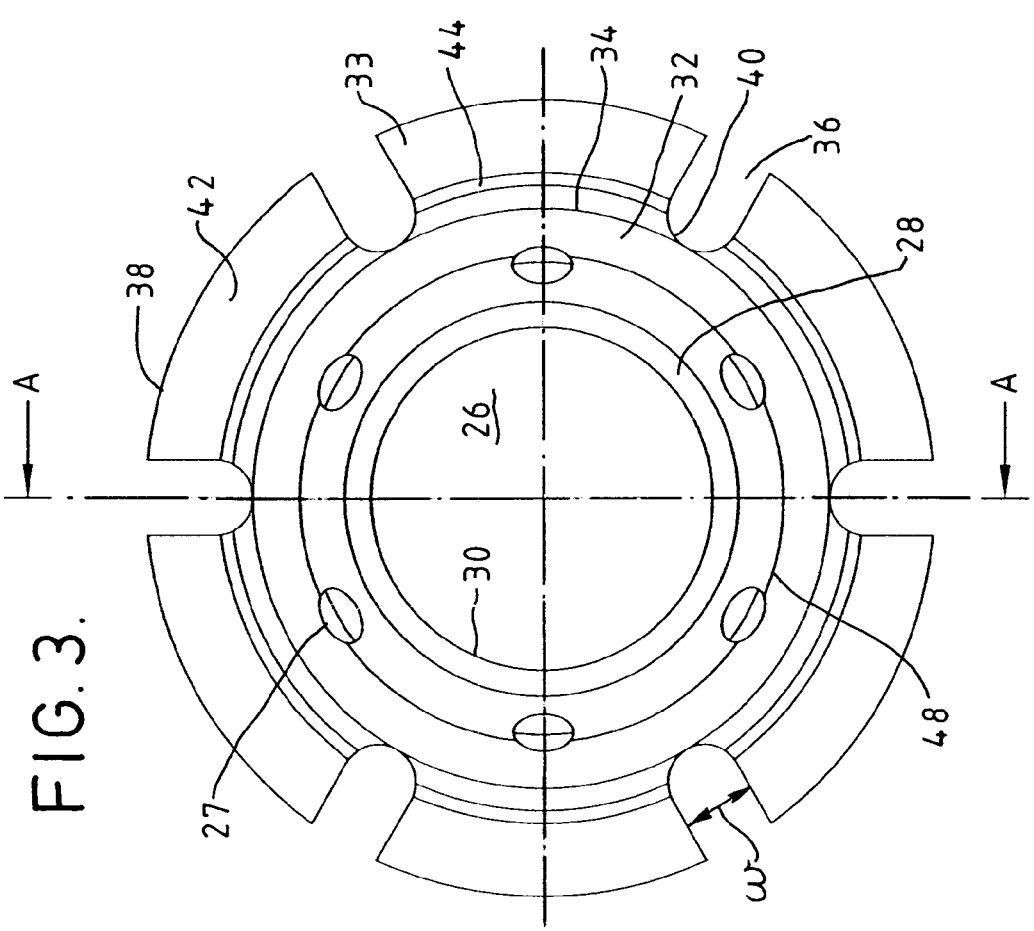
FIG. 3 is a front elevation view of an indicator and shown separately from the connector.

As shown in FIGS. 3 and 4, the indicator seal 24 has a central opening 26 for receiving the plug connector part 2. A circumferential collar 28 is provided around the opening 26, so that the inner surface 30 of the collar 28 will engage against the plug connector part 2 in use. A circumferentially extending rim 32 is also provided on the indicator seal, spaced by a radial distance R from the collar 28.

A relatively thin radial protrusion or flange portion 33 extends radially outwardly from the rim 32 and slots 36 are arranged in the flange portion 33 which extend radially outward from the outer edge 34 of the rim 32 to the outer edge 38 of the flange portion 33. As shown in FIG. 3, these slots have a width w and are rounded at their inner ends 40 so that the outer edge 34 of the rim 32 is tangential to the adjacent rounded ends 40 of the slots 36. Thus, the flange portion 33 forms petals 42 between the adjacent slots 36.

A hinge portion 44 is provided on the petals 42, extending circumferentially and located radially between the outer edge 34 of the rim 32 and the outer edge 38 of the flange portion 33. Consequently, the petals are able to fold along the hinge as will be described further below.

A hub 46 is provided on the indicator seal. The hub 46 is located radially inwardly of the rim 32 and extends circumferentially to the rear of the flange portion 33. The hub 46 has the function of retaining the indicator seal 24 at a fixed spacing from the flange 20 of the plug connector part 2, thus providing a space into which the petals may be folded as will be described further below. The hub also performs a sealing function as will be described.

Between the hub 46 and rim 32, a circumferentially extending junction region 48 of a thickness approximately equal to the thickness of the flange portion 33 is provided. The junction region 48 provides a further hinge 50 about which the seal can bend. A plurality of circumferentially spaced vent openings 27 are provided between the hub 46 and rim 32, approximately centred on the junction region 48.

In order to be clearly visible subsea and have a good level of flexibility, the indicator seal 24 is made of orange coloured nitryl or hydrogenated nitrile rubber.

In operation, the plug connector part 2 of the electrical subsea connector has a handle attached thereto by a yoke as discussed above. A remote operated vehicle (ROV) under the control of a pilot watching the vehicle on camera moves the plug connector part 2 into mating engagement with the socket connector part 4. The sequence of events once the plug part 2 is located within the socket part 4 is shown in FIG. 5.

As shown in FIG. 5a, before the plug 2 and socket 4 connector parts are fully mated, the petals 42 of the indicator seal 24 extend radially beyond both the plug and socket connector parts and so are clearly visible to the ROV pilot irrespective of the angle from which the camera is viewing the connector. More particularly, the petals protrude radially beyond the conical wall portion 12 of the socket connector part and the annular wall portion 18 of the plug connector part. During mating of the connector parts, the plug part 2 is pushed into the socket part 4 until the front end of the conical portion 12 of the socket connector part abuts the petals 42. In addition, the hub 46 abuts the front facing flange 20 of the annular wall portion 18 of the plug connector part 2. Consequently, the indicator seal 24 cannot be moved back towards the flange 20 on the plug connector part 2. This is shown in FIG. 5a.

Then, as the plug and socket connector parts are pushed closer together, the front edge of the rim 32 comes into contact with the inwardly facing conical surface 14 of the conical portion 12 and the petals 42 bend at the hinge 44 provided on the petals so that the outer portion of the petals lies against the inner conical surface 14. This position is shown in FIG. 5b.

Figure 5:
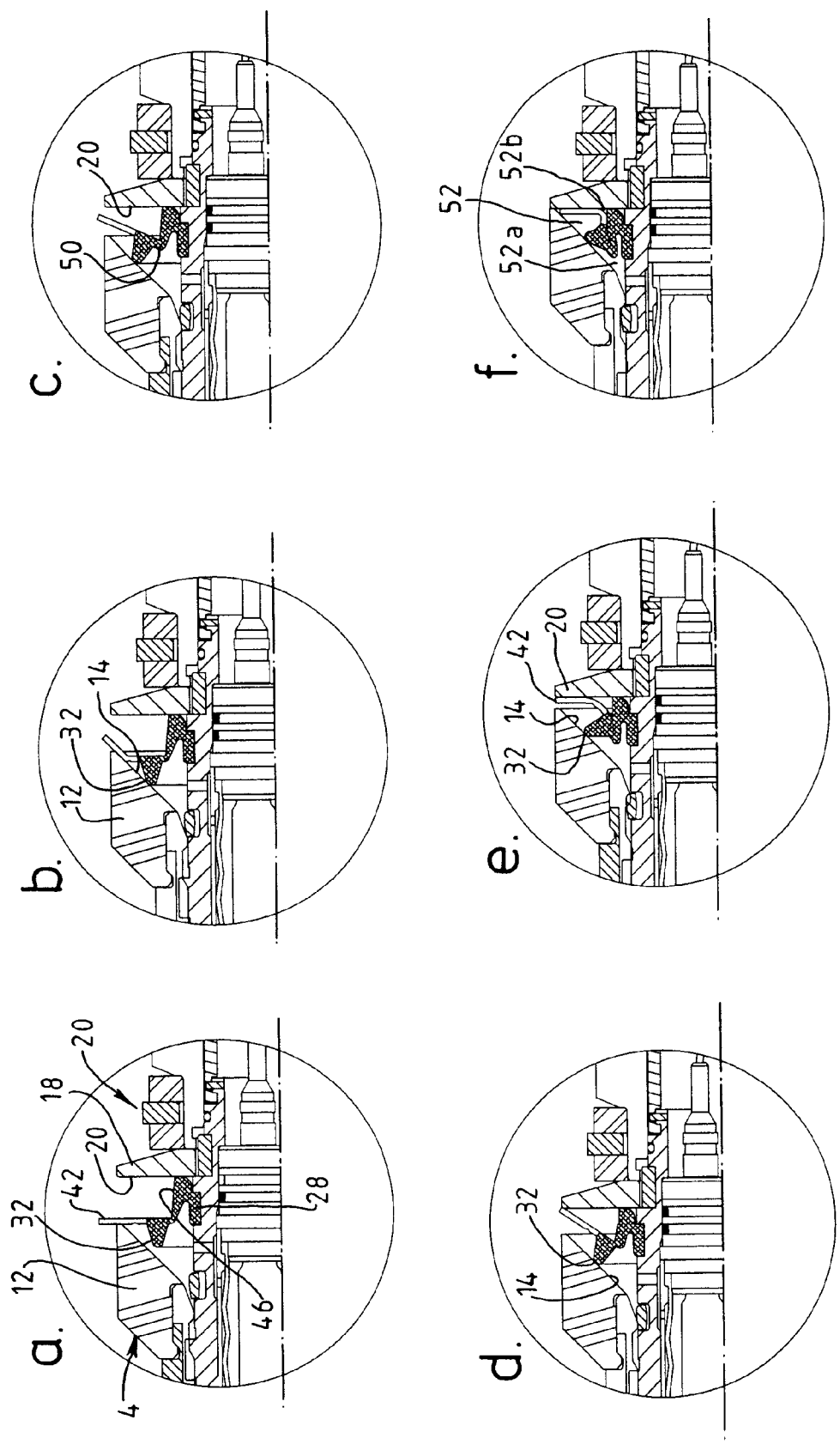
FIGS. 5a to 5f show the movement of an indicator as first and second connector parts are mated.

At the stage shown in FIG. 5 (and during all subsequent stages up to full mating) the front edge of the rim 32 forms a seal with surface 14. Water being forced out of region 52a as its volume decreases does not therefore flow past this seal, but instead escapes via vent openings 27 (shown in FIG. 3 but not shown in FIGS. 5a to 5f) into region 52b and then via radial slots 36 to the outside. The provision of the vent openings avoids a problem with water forcing its way past rim 32 and pushing the indicator seal generally radially outwardly, to the extent that the petals may be nipped between wall portions 12 and 18 and thus fail to retract inwardly.

As the plug and socket connector parts are moved still closer together, the indicator seal 24 is held against the flange 20 by the hub 46 and so cannot move back relative to the plug connector part 2 under the reaction force of the inwardly facing conical surface 14 of the socket connector part 4. Consequently, the reaction force of the socket connector part 4 acting on the rim 32 causes the indicator seal 24 to bend at its point of least thickness located radially inward of the rim 32 i.e. the seal 24 bends at the hinge 50 formed by the junction region 48 between the rim 32 and the hub 46 as described above. The rim 32 is therefore rotated radially outwardly relative to the inwardly facing conical surface 14 causing the petals 42 to release their contact with the conical surface 14. This position is shown in FIG. 5c.

As the plug 2 and socket 4 connector parts are moved still closer together, the rim 32 continues to be rotated rearwardly about the hinge 50 until the outer edges 38 of the petals 42 abut the front facing flange 20. This position is shown in FIG. 5d.

As the rim 32 continues to be rotated rearwardly due to the connector parts moving closer together, the petals 42 will then begin to fold at the hinge 44 so that the radially outer area of the petals 42 lies vertically against the surface of the flange 20. This is shown in FIG. 5e.

Finally, as shown in FIG. 5f, when the connector parts are fully mated so that the front end of the conical portion 12 abuts the front facing flange 20, the rim 32 has rotated through 90° to extend radially outwardly from the connector parts. The petals 42 are folded at the hinge 44 so that the area located radially externally of the hinge 44 lies against the flange 20 and thus, the petals are held entirely within an enclosure 52 formed within the connector parts when mated. Thus, once the connector parts are fully mated the petals will no longer be visible in a picture from the ROV camera and so the ROV operator will know that the connector parts are fully mated.

As also seen in FIG. 5f, the rim 32 forms a sealing connection with the inwardly facing conical surface 14 of the socket connector part 4. The vent openings are closed by the folding of the indicator seal at the hinge 50. The hub 46 seals against the annular wall portion 18 of the plug connector part 2. Thus a debris seal is provided to prevent entry of sand or the like into the mated connector parts.

Figure 8:
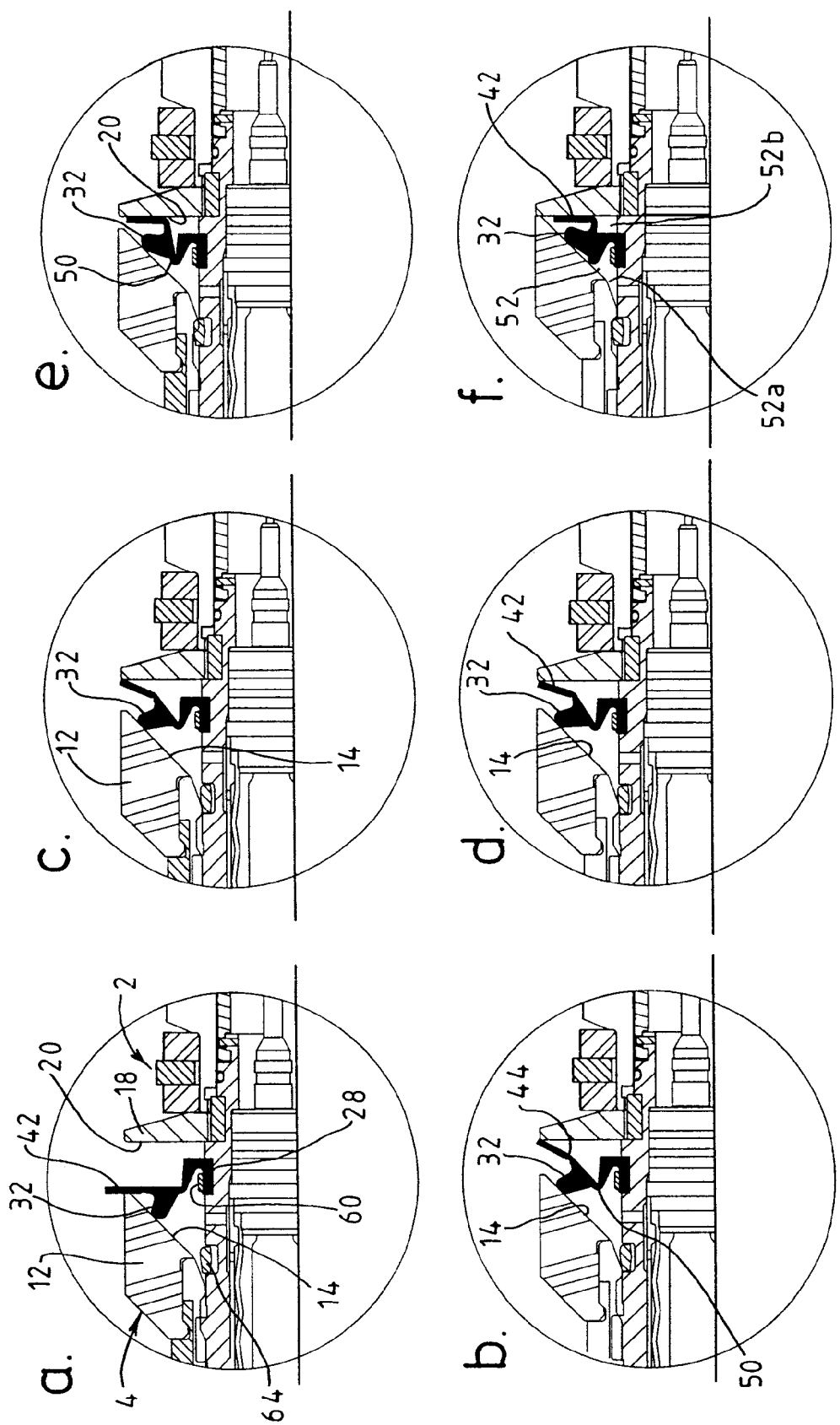
FIGS. 8a to 8f show the movement of the indicator of the second embodiment as the first and second connector parts are mated.

The second embodiment of the indicator seal 24 shown in FIGS. 6 and 8 is generally similar to the first embodiment and the same reference numerals are used where appropriate. One difference is that the circumferentially extending rim 32 projects slightly radially outwardly as well as forwardly, in order to improve the manner in which it engages with conical surface 14 of the conical portion 12. There is no rearwardly projecting hub 46, as in the case of the first embodiment. As seen in FIG. 8 a band 60 extends round the outside of collar 28 to ensure that the indicator seal 24 is held in place. A radially outwardly protruding lip 62 at the forward end of the collar 28 assists the engagement of the band 60 round the collar 28.

The sequence of events during mating of the plug part 2 with the socket part 4 is shown in FIG. 8.

As seen in FIG. 8a, the front edge of the rim 32 comes into contact with the inwardly facing conical surface 14 of the conical portion 12 at about the same time as the front of the conical portion 12 contacts the petals 42. The indicator seal then bends rearwardly at the hinge 50, as shown in FIG. 5b. The petals 42 contact the annular wall portion 18 of the plug connector part and bend forwardly at the hinge 44. This process continues as shown in FIGS. 5c–5f, with the effect being for the petals 42 to be retracted into the enclosure 52.

It will be appreciated that as the connector is being mated under water the region in front of and behind the indicator seal will contain water. The enclosure 52 consists of a region 52a in front of the indicator seal and a region 52b behind the indicator seal. During connection these regions diminish in volume. Region 52b vents its water to the outside via the radial slots 36 between the petals 42. Region 52a vents its water into region 52b via the vent openings 27 formed at intervals around the circumference of the hinge 50. Thus hydraulic locking, preventing connector mating, can be prevented.

A snap ring 64 extends circumferentially around plug connector part 2 to retain the socket connector part 4 in the mated condition. This snap ring 64 may be provided with surface relief on its radially outer surface to assist venting of water from region 52a during mating. The water may pass into the socket part 4 which is vented to the outside towards its rear, in known manner.

Once the connector is fully mated, as shown in FIG. 8f, the vent openings 27 are preferably fully closed by virtue of the bending of the indicator seal at hinge 50 though about 90°. The size of the openings may be chosen to be sufficiently small so that they are fully closed at this stage. In those circumstances the region 52a is protected from the entry of debris such as sand by the indicator seal sealing between the two connector parts. Even if the vent openings 27 are not fully closed they are reduced to a sufficiently small size by the bending of the indicator seal to stop ingress of most waterborne contaminants.

Although the invention has been described in relation to specific embodiments thereof, the skilled person will appreciate that the invention is not limited to that embodiment. For example, a seal having some of the described sealing features or an indicator having some of the described indicator features could usefully be used separately in many connector applications. In addition, the socket connector part is described as being provided at a seabed installation, with the plug being carried by an ROV or diver to the installation to make the connection. However, the reverse arrangement of the plug connector part being already installed and the socket connector part being transported to the connection site may be preferred in some applications. Further, subsea electrical and fibre optic connectors are only possible examples of the type of connectors with which the invention may be used.

What is claimed is:

1. A connector for under water or severe environment use, comprising first and second connector parts adapted to be brought together from an unmated condition into a mated condition, and an indicator for indicating when the first connector part and the second connector part are fully mated, the indicator being provided on the first connector part and having at least one radially outwardly extending protrusion, the radial protrusion being movable during mating of the first and second connector parts, from a radially outer position or a radially inner position when the connector is in the unmated condition, to a radially inner position or a radially outer position respectively, indicating that the connector is in the fully mated condition, wherein the radial protrusion is arranged to tilt rearwardly during mating generally about a base region thereof, and wherein the radial protrusion has a defined hinge portion located outwardly of the base region and a tip outward of the hinge portion arranged to tilt forwardly during mating about the hinge portion.

2. A connector as claimed in claim 1, wherein the hinge portion is a thinned portion of the radial protrusion.

3. A connector as claimed in claim 1, wherein the radial protrusion is arranged to extend radially beyond an adjacent portion of said first and second connector parts when in the radially outer position and to be retracted radially inwardly of the adjacent portions of said first and second connector parts when in the radially inner position.

4. A connector as claimed in claim 1, wherein the first and second connector parts have respective wall portions, said wall portions together defining an enclosure when the first and second connector parts are in the mated condition and the radial protrusion is contained in the enclosure when in the radially inner position.

5. A connector as claimed in claim 1, wherein said at least one radially extending protrusion comprises a plurality of radially extending protrusions and all of said plurality of radially extending protrusions are movable to indicate that the connector is in the fully mated condition.

6. A connector as claimed in claim 1, wherein said tip engages the second connector part during mating of the first and second connector parts.

7. A connector as claimed in claim 1, wherein the indicator has a hub portion with a front, the radial protrusion extends radially outwardly from the front of said hub, said connector defining a space radially outwardly of the hub and the radial protrusion moves into said space during mating of the first and second connector parts.

8. A connector a claimed in claim 1, wherein the indicator comprises vent means to allow a flow from one side of indicator to the other.

9. A connector as claimed in claim 1, wherein the radial protrusion is made of resilient material.

10. A connector as claimed in claim 1, wherein the indicator further comprises a seal extending about a periphery of the first connector part for sealing with the second connector part when the first and second connector parts are in the mated condition.

11. A connector for under water or severe environment use, comprising first and second connector parts adapted to be brought together from an unmated condition into a mated condition, and an indicator for indicating when the first connector part and the second connector part are fully mated, the indicator being provided on the first connector part and having at least one radially outwardly extending protrusion, the radial protrusion being movable during mating of the first and second connector parts, from a radially outer position or a radially inner position when the connector is in the unmated condition, to a radially inner position or a radially outer position respectively, indicating that the connector is in the fully mated condition, wherein the indicator has a hub from the front of which the radial protrusion extends radially outwardly, there being a space radially outwardly of the hub into which the radial protrusion can tilt rearwardly during mating.

12. A connector as claimed in claim 11, wherein the indicator comprises a vent to allow a flow from one side of the indicator to the other.

13. A connector as claimed in claim 11, wherein the radial protrusion is made of a resilient material.

14. A connector as claimed in claim 11, wherein the indicator further comprises a seal extending about the periphery of the first connector part for sealing with the second connector part when the connector is mated.

15. A connector as claimed in claim 11, wherein said radial protrusion comprises a thinned portion radially outwardly of said hub, said thinned portion defining a hinge.

16. A connector as claimed in claim 11, wherein the radial protrusion is arranged to extend radially beyond an adjacent portion of said first and second connector parts when in the radially outer position and to be retracted radially inwardly of the adjacent portions of said first and second connector parts when in the radially inner position.

17. A connector as claimed in claim 11, wherein the first and second connector parts have respective wall portions, said wall portions together defining an enclosure when the first and second connector parts are in the mated condition and the radial protrusion is contained in the enclosure when in the radially inner position.

18. A connector as claimed in claim 11, wherein said at least one radially extending protrusion comprises a plurality of radially extending protrusions and all of said plurality of radially extending protrusions are movable to indicate that the connector is in the fully mated condition.

19. A connector as claimed in claim 11, wherein the indicator is provided with a nose portion which projects forwardly of the radial protrusion for engagement by the second connector part during mating of the first and second connector parts.

* * * * *